United States Patent [19]

Park

[11] 3,925,587

[45] Dec. 9, 1975

[54] PERVIOUS LOW DENSITY CARBON FIBER REINFORCED COMPOSITE ARTICLES

[75] Inventor: Im Keun Park, Summit, N.J.

[73] Assignee: Celanese Corporation, New York, N.Y.

[22] Filed: July 31, 1974

[21] Appl. No.: 493,633

Related U.S. Application Data

[62] Division of Ser. No. 347,594, April 3, 1973, Pat. No. 3,859,158, which is a division of Ser. No. 135,698, April 20, 1971, Pat. No. 3,779,789.

[52] U.S. Cl................ 428/255; 28/75; 139/420 C; 139/420 R; 156/330; 156/331; 264/29; 427/430; 427/434; 428/257; 428/408
[51] Int. Cl.²........................................ C09J 5/02
[58] Field of Search.......... 423/447; 161/88, 89, 90, 161/92, 93, 182; 156/330, 331; 139/420 C, 420 R, 426 R; 23/209.1, 209.3; 28/75; 427/139, 23, 430, 434; 428/228, 245, 247, 255, 257, 408; 264/29

[56] References Cited
UNITED STATES PATENTS

| | | | |
|---|---|---|---|
| 3,072,558 | 1/1963 | Myers et al.................. | 204/280 |
| 3,073,004 | 1/1963 | Zeise.............................. | 139/420 C |
| 3,417,794 | 12/1968 | Lynch et al..................... | 139/426 R |
| 3,669,158 | 6/1972 | Phillips.................. | 161/93 |
| 3,818,082 | 6/1974 | Burns et al..................... | 139/420 R |

*Primary Examiner*—William J. Van Balen
*Assistant Examiner*—James J. Bell

[57] ABSTRACT

An improved low density carbon fiber reinforced composite article is provided. At least one layer of a highly directional carbon fiber tape of a specifically defined open weave construction is provided in intimate association with a substantially cured thermosetting resinous material which is present in a concentration of about 20 to 50 percent by weight based upon the total weight of the composite article.

The composite articles of the present invention exhibit a high specific modulus and strength, and are extremely lightweight. The lightweight composite articles may be utilized as structural elements, and are particularly suited for use as a facing sheet of an acoustic sandwich liner which serves as a noise suppression function in jet engines.

10 Claims, 3 Drawing Figures

PERVIOUS LOW DENSITY CARBON FIBER REINFORCED COMPOSITE ARTICLES

This is a division, of application Ser. No. 347,594, filed Apr. 3, 1973 (now U.S. Pat. No. 3,859,158); which is a division of application Ser. No. 135,698, filed Apr. 20, 1971 (now U.S. Pat. No. 3,779,789).

BACKGROUND OF THE INVENTION

In the search for high performance materials, considerable interest has been focused upon carbon fibers. The terms "carbon" fibers or "carbonaceous" fibers are used herein in the generic sense and include graphite fibers as well as amorphous carbon fibers. Graphite fibers are defined herein as fibers which consist essentially of carbon and have a predominant x-ray diffraction pattern characteristic of graphite. Amorphous carbon fibers, on the other hand, are defined as fibers in which the bulk of the fiber weight can be attributed to carbon and which exhibit as essentially amorphous x-ray diffraction pattern. Graphite fibers generally have a higher Young's modulus than do amorphous carbon fibers and in addition are more highly electrically and thermally conductive.

Industrial high performance materials of the future are projected to make substantial utilization of fiber reinforced composites, and graphitic carbon fibers theoretically have among the best properties of any fiber for use as high strength reinforcement. Among these desirable properties are corrosion and high temperature resistance, low density, high tensile strength, and high modulus.

As is known in the art, numerous procedures have been proposed in the past for the conversion of various organic polymeric fibrous materials to a carbonaceous form while retaining the original fibrous configuration essentially intact. Such procedures have in common the thermal treatment of the fibrous precursor in an appropriate atmosphere or atmospheres which is commonly conducted in a plurality of heating zones, or alternatively in a single heating zone wherein the fibrous material is subjected to progressively increasing temperatures. Both batch and continuous processing techniques have been proposed. From the commercial standpoint those processes which are capable of functioning on a continuous basis are generally considered to be the most attractive. However, many of the prior art continuous conversion techniques have been inherently limited to the processing of a single end of fibrous precursor at a given time. Such techniques while offering the advantages of possible automation, still suffer the disadvantage of limited productivity.

Techniques have heretofore been proposed for the simultaneous conversion of a substantial number of fibrous ends to a carbonaceous form which have involved the thermal treatment of a fibrous precursor while in the form of a woven cloth. See, for instance. Belgian Pat. Nos. 720,947 and 726,761, as well as U.S. Pat. No. 3,541,582 for representative disclosures of the processing of woven cloth precursors. However, the fiber bundles present in the conventionally woven carbon cloths commonly possess at least some permanent crimp at the warp and weft cross-over points and the single filament tensile properties of the fibers present within the cloths have tended to be adversely influenced.

There has arisen in the advanced engineering composite art the need for an efficient technique to produce pervious carbon fiber reinforced high strength composite articles of extremely low density. Woven carbon fabrics or cloths wherein weaving of a fibrous precursor was conducted prior to thermal conversion have been unsuitable for use in such applications because of (a) the high fiber density within the same and (b) impaired tensile properties resulting from fiber crimp. Prior attempts at the production of pervious low density carbon fiber reinforced composites have involved the tedious weaving of previously carbonized fiber bundles to form a substantially balanced cloth of an open weave construction which is subsequently resin impregnated with a matrix material. Such weaving by necessity must be conducted at a relatively slow rate because of the fragile nature of the previously carbonized fiber bundles. Even if such special weaving techniques are utilized, difficulties have arisen, however, with respect to the quality of fibrous reinforcement since the carbonized fiber bundles tend to be readily damaged during weaving with a concomitant diminution of their tensile properties.

It is an object of the invention to provide a novel low density carbon fiber reinforced composite article comprising at least one layer or ply of a highly directional woven carbon fiber tape having an improved open weave construction which is impregnated with a substantially cured thermosetting resinous material.

It is an object of the invention to provide a novel carbon fiber tape of a highly directional open weave construction which is suitable for use as a fibrous reinforcing medium in a pervious low density composite article.

It is another object of the invention to provide improved pervious low density carbon fiber reinforced composite articles exhibiting superior translation of fiber properties into composite properties.

It is another object of the invention to provide improved pervious low density carbon fiber reinforced composite articles exhibiting a bulk density of about 0.4 to 1.4 grams/c.c.

It is a further object of the invention to provide pervious low density carbon fiber reinforced composite articles which exhibit excellent mechanical properties, and which are particularly suitable for use as facing sheets of an acoustic sandwich liner which serves as a noise suppression function in a turbofan nacelle for a jet engine.

These and other objects as well as the scope, nature, and utilization of the invention will be apparent from the following detailed description and appended claims.

SUMMARY OF THE INVENTION

It has been found that an improved carbon fiber reinforced composite article comprises:

a. at least one layer of carbon tape of an open weave construction comprising a plurality of adjacent substantially parallel and laterally spaced linear warp ends of a carbonaceous fibrous material containing at least 90 percent carbon by weight substantially coextensive with the length of said tape wherein no substantial lateral contact is made between said adjacent warp ends, and a fibrous weft pick containing at least 90 percent carbon by weight interlaced with said warp ends in a plain weave construction at aa frequency of about 2 to 8 picks per inch of said tape with said weft pick being provided under a tension sufficient that said linear configuration of said warp ends is substantially unimpaired, and b. a substantially cured thermosetting resinous material in intimate association with said carbon tape in a concentration of about 20 to 50 percent by weight based upon the total weight of said composite article wherein lateral interstices are substantially maintained between said adjacent warp ends within a given layer of said tape of said composite article.

DESCRIPTION OF PREFERRED EMBODIMENTS

Figure 1:
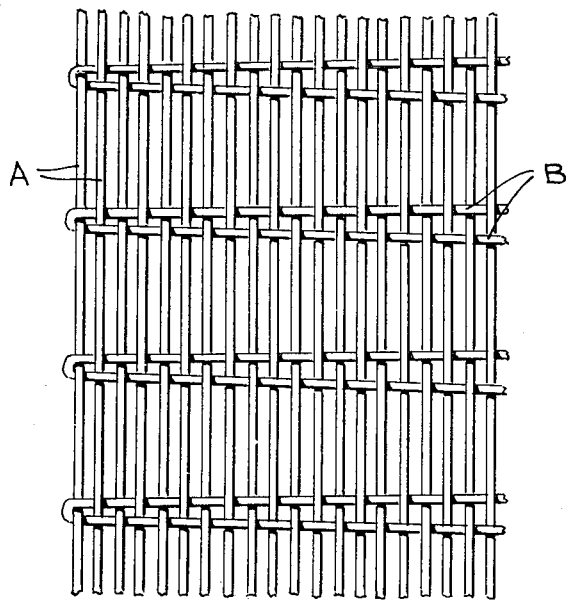
FIG. 1 is an enlarged plan view of a portion of fibrous open weave tape suitable for use as a precursor in the process of the present invention.

The precursor tape which is converted to a carbonaceous fibrous material comprises a plurality of adjacent substantially parallel and laterally spaced linear warp ends substantially coextensive with the length of the tape. The tape possesses a plain weave construction (described in detail hereafter) wherein each weft pick passes successively over and under each warp end.

The warp ends are composed of an organic polymeric fibrous material capable of conversion to a carbonaceous fibrous material. The warp ends may be conveniently selected from those fibrous materials which are recognized as being suitable for thermal conversion to a carbonaceous fibrous material. For instance, the warp ends may be derived from organic polymers such as an acrylic polymer, a cellulosic polymer, a polyamide, a polybenzimidazole, polyvinyl alcohol, pitch, etc. As discussed hereafter, acrylic polymeric materials are particularly suited for use in the formation of the warp ends employed in the present process. Illustrative examples of suitable cellulosic materials include the natural and regenerated forms of cellulose, e.g., rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2'-m-phenylene-5,5'-bibenzimidazole.

The acrylic polymeric material prior to thermal stabilization is formed primarily of recurring acrylonitrile units. For instance, the acrylic polymer should contain not less than about 85 mol percent of acrylonitrile units with not more than about 15 mol percent of a monovinyl compound which is copolymerizable with acrylonitrile such as styrene, methyl acrylate, methyl methacrylate, vinyl acetate, vinyl chloride, vinylidene chloride, vinyl pyridine, and the like, or a plurality of such monomers. A particularly preferred acrylic polymeric materials is an acrylonitrile homopolymer, or a closely related acrylonitrile copolymer (i.e., contains at least about 95 mol percent of acrylonitrile units and up to about 5 mol percent of one or more monovinyl compounds copolymerized with acrylonitrile).

The warp ends may be provided in a variety of physical configurations. For instance, the warp ends may assume the configuration of continuous lengths of multifilament yarns, tows, strands, cables, or similar fibrous assemblages. In a preferred embodiment of the process the warp ends are a continuous multifilament yarn.

For example, the laterally spaced warp ends are preferably a continuous multifilament yarn (e.g., an acrylic yarn) having a total denier of about 80 to 10,000 (preferably about 500 to 4000), and a denier per filament of about 1 to 3 (preferably about 2), which are provided in the precursor tape at a frequency of about 4 to 200 (preferably about 7 to 20) ends per inch of tape width.

The warp ends may optionally be provided with a twist which tends to improve the handling characteristics. For instance, a twist of about 0.1 to 5 tpi, and preferably about 0.3 to 1.0 tpi, may be utilized. Also, a false twist may be used instead of or in addition to a real twist. Alternatively, one may select bundles of fibrous material which possess essentially no twist.

The warp ends may be drawn in accordance with conventional techniques in order to improve their orientation. For instance, acrylic warp ends may be preliminarily drawn by stretching before or after incorporation in the tape while in contact with a hot shoe at about 140° to 160°C. Additional representative drawing techniques are disclosed in U.S. Pat. Nos. 2,455,173; 2,948,581; and 3,122,412. It is recommended that acrylic warp ends selected for use in the process be initially drawn to a single filament tenacity of at least about 3 grams per denier. If desired, however, the warp ends may be more highly oriented, e.g., drawn up to a single filament tenacity of about 7.5 to 8 grams per denier, or more The weft pick of the precursor tape is preferably also composed of an organic polymeric fibrous material which is capable of undergoing carbonization without the destruction of its original fibrous configuration. If desired, however, the weft pick may be initially provided as a previously stabilized organic polymeric fibrous material. For example, the weft pick may be initially provided as a previously stabilized (e.g. preoxidized) acrylic fibrous material.

The fibrous weft pick may be provided in a variety of physical configurations. For instance, the weft pick may assume the configuration of a multifilament yarn, tow, strand, cable, or similar assemblage. In a preferred embodiment of the process the weft pick (e.g., a continuous multifilament yarn) has a total denier equal to or preferably less than that of the warp ends (e.g., continuous multifilament yarn warp ends). The total denier for the weft pick accordingly may range from about 40 to 5000. Preferably the total denier of a multifilament acrylic yarn weft pick prior to thermal stabilization is below about 400, e.g., about 40 to 350, total denier. In particularly preferred embodiment of the process the total denier of the weft pick is about 0.2 to 0.5 times the total denier of a warp end. A minor amount of twist may be beneficially provided in a multifilament yarn weft pick which improves the handling characteristics during weaving. For instance, the weft pick may be provided with a twist of about 0.1 to 5 tpi (preferably 0.1 to 3 tpi), and most preferably about 0.2 to 0.7 tpi. If a twist is utilized in the warp ends, it is recommended that any twist employed in the weft pick be to a lesser degree so that the weft pick may readily assume a more flatened configuration when in contact with warp ends.

It is essential that the weft pick utilized in the formation of the tape lacks a tendency to undergo excessive shrinkage during heat treatment (described hereafter) which would eliminate a laterally spaced relationship of the adjacent warp ends, impart a pucker (i.e., non-linear configuration) to the warp ends, or interfere with the flat configuration of the tape. In a preferred embodiment of the process the weft pick is hot drawn at least about 3 times its as-spun length to increase its orientation and is subsequently relaxed (e.g., 5 to 40 percent of drawn length) prior to incorporation in the precursor tape so that its tendency to undergo shrinkage is minimized.

The fibrous material utilized as the warp ends and weft pick may optionally be provided in intimate association with one or more catalytic agents capable of enhancing the rate of the thermal conversion to a carbonaceous fibrous material.

The fibrous open weave tape utilized as the precursor is provided in a plain open weave construction which is unbalanced in the sense that the numerical proportion of warp ends to weft picks per square inch present within the same is substantially greater than 1:1. Commonly the tape comprises 50 to 200 adjacent warp ends; however, even a substantially larger number of warp ends can be employed, e.g., 500 or more. The warp ends are substantially coextensive with the length of the tape. The weft pick present within the tape is provided at a frequency of about 2 to 8 picks per inch of the tape (preferably 2 to 6 picks per inch of the tape), and is most preferably provided at a frequency of about 4 picks per inch of the tape. The optimum pick frequency selected is influenced by the total denier of the weft pick. For instance, if a pick frequency as great as 8 is utilized the weft pick preferably does not possess a total denier in excess of about 100. If the pick frequency is much less than about 2 picks per inch of the tape, then weave stability is not achieved and the desired lateral separation of adjacent warp ends is unattainable. If the pick frequency is much more than about 8 picks per inch, then there is a tendency for the weft pick to impart a crimp or non-linear configuration to the warp ends which results in diminished tape tensile properties in the longitudinal direction. Since the weft pick is provided at a relatively low frequency, and preferably as a continuous length, it may intersect the edge of the tape at an angle other than exactly ninety degrees unlike common woven fabrics. The exact angle of intersection with the edge of the tape is influenced by the pick frequency, and the width of the tape (i.e. number and total denier of the warp ends). If desired, the edge of the tape may optionally be removed following weaving wherein the weft pick is cut into a plurality of discrete lengths which traverse the parallel warp ends.

The plain weave construction of the precursor tape is such that the adjacent warp ends are spaced by the weft pick in such a manner that no substantial lateral contact is made between the same and a flat tape is produced. The weft pick is provided under a tension sufficient that the linear configuration of the warp ends present within the tape is substantially unimpaired. Additionally, any crimp which is present in the tape components should be present in the weft pick and not in the warp ends.

The precursor tape of the open weave construction utilized in the present process can be formed employing conventional weaving equipment as will be apparent to those skilled in weaving technology. For instance, the warp ends may be beamed in a laterally spaced manner, and the weft pick subsequently inserted at appropriate intervals utilizing a narrow fabric shuttle loom. Care, of course, must be taken to insure that the tension exerted upon the weft pick is insufficient to impair the substantially linear configuration of the warp ends.

The heating temperatures, heating atmospheres, and residence times utilized in the present process to produce carbon fibers may be in accordance with thermal conversion techniques heretofore known in the art. The plurality of adjacent ends of an organic polymeric fibrous material as well as the fibrous weft pick while in the form of a tape (as heretofore described) are converted to a carbonaceous fibrous material by continuous passage in the direction of the tape length through a series of heating zones while substantially suspended therein to form a fibrous product which contains at least 90 percent carbon by weight. During the thermal conversion a substantially uniform lateral shrinkage of the tape of about 10 to 50 percent based upon the original tape width commonly occurs. However, throughout the thermal conversion treatment an open weave construction of the tape is preserved with no substantial contact being made between the laterally adjacent warp ends.

The series of heating zones through which the open weave tape is continuously passed commonly include (1) a stabilization zone, and (2) a carbonization zone.

The stabilization heating zone is commonly provided at a temperature of about 200° to 400°C. depending upon the composition of the tape. As will be apparent to those skilled in the art, the atmosphere provided in the stabilization heating zone may be varied. For instance, a cellulosic precursor is commonly stabilized in (1) an oxygen-containing atmosphere or (2) in an inert or non-oxidizing atmosphere, such as nitrogen, helium, argon, etc. Additionally, precursors such as an acrylic polymer, a polyamide, a polybenzimidazole, or polyvinyl alcohol are commonly stabilized in an oxygen-containing atmosphere. Air may be conveniently selected as the oxygen-containing atmosphere for use in the process. When the stabilization treatment is conducted in an oxygen-containing atmosphere, it is commonly termed a "preoxidation" treatment.

The stabilization heating zone is substantially enclosed in order to facilitate the confinement and withdrawal of off gases and/or the maintenance of an appropriate atmosphere. When a non-oxidizing atmosphere is desired within the heat treatment chamber, the tape may pass through a seal as it continuously enters and leaves the heat treatment chamber in order to exclude oxygen.

The stabilization of fibers of acrylonitrile homopolymers and copolymers in an oxygen-containing atmosphere involves (1) an oxidative cross-linking reaction of adjoining molecules as well as (2) a cyclization reaction of pendant nitrile groups to a condensed dihydropyridine structure. While the reaction mechanism is complex and not readily explainable, it is believed that these two reactions occur concurrently, or are to some extent competing reactions.

The cyclization reaction involving pendant nitrile groups which occurs upon exposure of an acrylic fibrous material to heat is generally highly exothermic and, if uncontrolled, results in the destruction of the fibrous configuration of the starting material. In some instances this exothermic reaction will occur with explosive violence and result in the fibrous material being consumed by flame. More commonly, however, the fibrous material will simply rupture, disintegrate and/or coalesce when the critical temperature is reached. As the quantity of comonomer present in an acrylonitrile copolymer is increased, a fibrous material consisting of the same tends to soften at a progressively lower temperature and the possible destruction of the original fibrous configuration through coalescence of adjoining fibers becomes a factor of increasing importance. The "critical temperature" referred to herein is defined as the temperature at which the fibrous configuration of a given sample of acrylic fibrous starting material will be destroyed in the absence of prior stabilization.

In a preferred embodiment of the invention the acrylic starting material exhibits a critical temperature of at least about 300°C., e.g., about 300°C. to 330°C. In addition to visual observation, the detection of the critical temperature of a given acrylic fibrous material may be aided by the use of thermoanalytical methods, such as differential scanning calorimeter techniques, whereby the location and magnitude of the exothermic reaction can be measured quantitatively.

The stabilized acrylic warp ends (1) retain essentially the same fibrous configuration as the starting material, (2) are capable of undergoing carbonization, (3) are black in appearance, (4) are nonburning when subjected to an ordinary match flame, and (5) commonly contain a bound oxygen content of at least about 7 percent by weight as determined by the Unterzaucher analysis.

In a preferred embodiment of the process the open weave tape (heretofore described) if stabilized in accordance with the processing conditions of commonly assigned U.S. Ser. Nos. 749,957, filed Aug. 8, 1968 (now abandoned), and 865,332, filed Oct. 10, 1969 (now abandoned) which are herein incorporated by reference.

The carbonization heating zone is commonly provided with an inert or non-oxidizing atmosphere at a temperature of at least about 900°C. (e.g. 900° to 1600°C.). Suitable inert atmospheres include nitrogen, argon, helium, etc. During the carbonization reaction elements present in the tape other than carbon, e.g., nitrogen, hydrogen and oxygen are substantially expelled until the warp ends contain at least 90 percent carbon by weight, and preferably at least 95 percent carbon by weight.

An optional graphitization zone is commonly provided with an inert or non-oxidizing atmosphere at a more highly elevated temperature of about 2000 to 31000°C. In a preferred embodiment of the process a graphitized open weave tape is produced wherein the fiber of the warp ends exhibits a Young's modulus of at least about 40,000,000 psi, and a tensile strength of at least about 250,000 psi.

A longitudinal tension may optionally be applied to the tape while passing through the stabilization, carbonization and/or graphitization heating zones in accordance with techniques known in the art.

In a preferred embodiment of the process the carbonization and graphitization of a stabilized acrylic open weave tape may be conducted by the continuous passage of the same through a single heating apparatus, such as the susceptor of an induction furnace, provided with a temperature gradient in accordance with the teachings of commonly assigned U.S. Ser. No. 777,275, filed Nov. 20, 1968 (now abandoned), which is herein incorporated by reference. A particularly preferred susceptor for use in the production of carbonaceous fibrous materials while in tape form is disclosed in commonly assigned U.S. Ser. No. 46,675, filed June 16, 1970 (now U.S. Pat. No. 3,656,910), which is herein incorporated by reference.

The carbonaceous tape, whether formed of amorphous or graphitic carbon, can next optionally be passed through a surface treatment zone wherein its ability to bond to a thermosetting resinous matrix material is enhanced. Any conventional surface treatment technique may be selected.

As previously indicated, during the stabilization and carbonization steps of the present process it is common for the width of the tape to diminish due to controlled shrinkage as elements other than carbon are expelled. A flat tape configuration is nevertheless retained, as well as an open weave construction wherein no substantial lateral contact is made between adjacent warp ends.

The open weave tape undergoing treatment in the present process is continuously passed in the direction of its length through each of the heating zones (e.g. a stabilization zone and a carbonization zone). If desired, the forward movement of the tape may be terminated between heating zones and the tape collected upon a support where it is stored prior to additional processing. It is recommended, however, that the heating zones be aligned in close proximity and the tape continuously passed from one zone to another without termination of the forward movement. Various rolls, or other guides may be employed to direct the movement of the tape as will be apparent to those skilled in fiber technology.

The resulting carbon tape is next impregnated with a thermosetting resinous material while maintaining lateral interstices between adjacent warp ends within a given layer of tape. The impregnation step may be conducted on either a continuous or a batch basis. For instance, the carbon tape may be continuously passed through an impregnation or coating zone wherein the thermosetting resinous material is continuously applied, or segments or layers of the tape may be impregnated while statically situated. A single layer of open weave carbon tape, or a plurality of superimposed layers of the tape may be impregnated at one time since the pervious structure of the layers allows free passage of the thermosetting resinous material.

The thermosetting resinous material is applied to the carbon tape while in a liquid consistency, and may be applied from either a solvent or a solventless system. Freely flowing dilute (i.e., highly cut) or low viscosity resin systems are preferred. Preferred impregnation techniques include the immersion of the carbon tape in a resin bath. The preservation of lateral interstices between adjacent warp ends within a given layer of carbon tape may be enhanced by the passage of a current of gas therethrough immediately following application of the liquid thermosetting resinous material. For instance, the current of gas may be passed therethrough upon withdrawal from the resin bath.

Representative thermosetting resinous materials which may be utilized in the formation of the composite articles include: epoxy resins, phenolic resins, polyester resins, polyimide resins, polybenzimidazoles, polyurethanes, etc. The preferred thermosetting resinous material is an epoxy resin or an aromatic polyimide resin.

The epoxy resin utilized as the resinous impregnation or matrix material may be prepared by the condensation of bisphenol A (4,4' isopropylidene diphenol) and epichlorohydrin. Also, other polyols, such as aliphatic glycols and novolak resins (e.g., phenol-formaldehyde resins), acids or other active hydrogen containing compounds may be reacted with epichlorohydrin for the production of epoxy resins suitable for use as the resinous matrix material. Epoxy resins are preferably selected which possess or can be modified to possess the requisite flow characteristics prior to curing. Numerous reactive diluents or modifiers which are capable of increasing the flow properties of uncured epoxy resins are well known and include butyl gylcidyl ether, higher molecular weight aliphatic and cycloaliphatic monoglycidyl ethers, styrene oxide, aliphatic and cycloaliphatic dicylcidyl ethers, and mixtures of the above.

In preferred embodiments of the invention, epoxy resins are selected to serve as the resinous impregnation material which possess terminal epoxide groups and are the condensation product of bisphenol A and epichlorohydrin of the following formula:

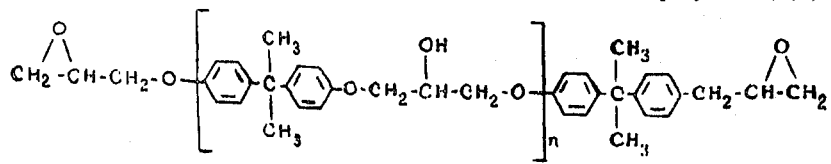

where $n$ varies between zero and a small number less than about 10. When $n$ is zero, the resin prior to curing is a very fluid light-colored material which is essentially the diglycidyl ether of bisphenol A. As the molecular weight increases so generally does the viscosity of the resins. Accordingly, particularly preferred liquid epoxy resins generally possess an n value averaging less than about 1.0. Illustrative examples of standard trade designations of particularly useful commercially available epoxy resins includes: Epi-Rez 508, and Epi-Rez 510 (Celanese Coatings). ERLA 2256 (Union Carbide), ERLA 4617 (Union Carbide), and Epon (Shell) epoxy resins.

Epoxy novolak resins formed by the reacting of epichlorohydrin with phenol-formaldehyde resins are also particularly preferred thermosetting resins. An illustrative example of a highly useful resin is Epi-Rez 5155 epoxy novolak resin (Celanese Coatings).

A variety of epoxy resin curing agents may be employed in conjunction with the epoxy resin. The curing or hardening of the epoxy resin typically involves further reaction of the epoxy or hydroxyl groups to cause molecular chain growth and cross-linking. The term "curing agent" as used herein is accordingly defined to include the various hardeners of the co-reactant type. Illustrative classes of known epoxy curing agents which may be utilized include aliphatic and aromatic amines, polyamides, tertiary amines, amine adducts, acid anhydrides, acids, aldehyde condensation products, and Lewis acid type catalysts, such as boron trifluoride. The preferred epoxy curing agents for use with the epoxy resin are acid anhydrides (e.g., hexahydrophthalic acid and methylbicyclo[2.2.1]heptene-2,2-dicarboxylic anhydride isomers marketed under the designation Nadic Methyl Anhydride by the Allied Chemical Company). and aromatic amines (e.g., meta-phenylene diamine and dimethylaniline).

In preferred embodiments, aromatic polyimide resins are selected to serve as the resinous impregnation material which as is known in the art are produced essentially in two steps by the reaction of a dianhydride with a diprimary aromatic amine. In the first step of the reaction, a polyamine acid is formed which may be subsequently converted by heat or through the use of suitable catalysts and water acceptors to high-molecular-weight polyimides. The resulting aromatic polyimides may be either linear or cross-linked. When both precursors are aromatic, impregnation polymers of improved heat resistance are developed.

Representative dianhydride reactants for use in the formation of the aromatic polyimides include:
pyromellitic dianhydride (PMDA):
2,3,6,7-naphthalenetetracarboxylic acid dianhydride;
3,3',4,4'-diphenyltetracarboxylic acid dianhydride:
1,2,5,6-naphthalenetetracarboxylic acid dianhydride;
2,2',3,3'-diphenyltetracarboxylic acid dianhydride;
thiophene-2,3,4,5-tetracarboxylic acid, anhydride;
2,2-bis(3,4-biscarboxyphenyl)propane dianhydride (PPDA);
3,4-dicarboxyphenyl sulfone dianhydride;
perylene-3,4,9,10-tetracarboxylic acid dianhydride;
bis(3,4-dicarboxyphenyl) ether dianhydride (PEDA);
ethylenetetracarboxylic acid dianhydride; and
3,4,3',4'-benzophenonetetracarboxylic dianhydride (BTDA).

Representative diamine reactants for use in the formation of the aromatic polyimides include:
m-phenylenediamine (MPD);
p-phenylenediamine (PPD);
2,2-bis(4-aminophenyl)propane (DDP);
4,4'-methylenedianiline (DDM);
benzidine (PP);
4,4'-diaminodiphenyl sulfide (PSP);
4,4'-diaminodiphenyl sulfone (PSO₂P);
4,4'-diaminodiphenyl ether (POP);
1,5-diaminonaphthalene;
3,3'-dimethylbenzidine;
3,3'-dimethoxybenzidine;
2,4-bis(B-amino-tert-butyl)toluene;
bis(4-B-amino-tert-butyl phenyl) ether;
1,4-bis(2-methyl-4-aminopentyl)benzene;
1-isopropyl-2,4-phenylenediamine;
m-xylylenediamine;
p-xylylenediamine;
di(4-aminocyclohexyl)methane;
hexamethylenediamine;
heptamethylenediamine;
octamethylenediamine;
nonamethylenediamine;
decamethylenediamine;
oxydianiline;
3-methylheptamethylenediamine;
4,4-dimethylheptamethylenediamine;
2,11-diaminododecane;
1,2-bis(3-aminopropoxyethane);
2,2-dimethylpropylenediamine;
3-methoxyhexamethylenediamine;
2,5-dimethylhexamethylenediamine;
2,5-dimethylheptamethylenediamine;
3-methylheptamethylenediamine;
1,4-diaminocyclohexane;
1,12-diaminooctadecane;

bis(3-aminopropyl)sulfide; and
bis(3-aminopropyl)methylamine.

An illustrative example by standard trade designation of a particularly useful commercially available polyimide resin in Pyralin 4707 polyimide (DuPont).

Representative aromatic polyimide formation techniques are disclosed in Chapter 8 of "New Linear Polymers", by Henry Lee et al (McGraw-Hill, 1967), U.S. Pat. Nos. 3,179,630; 3,179,631; 3,179,632; 3,179,633; 3,179,634, and 3,558,350. Each of these disclosures is herein incorporated by reference.

The quantity of thermosetting resinous material applied to the carbon tape is adjusted so that upon curing the thermoset resinous material is in intimate association with at least one layer of the tape in a concentration of about 20 to 50 per cent by weight based upon the total weight of the resulting composite article, and preferably in a concentration of about 25 to 40 percent by weight.

Figure 3:
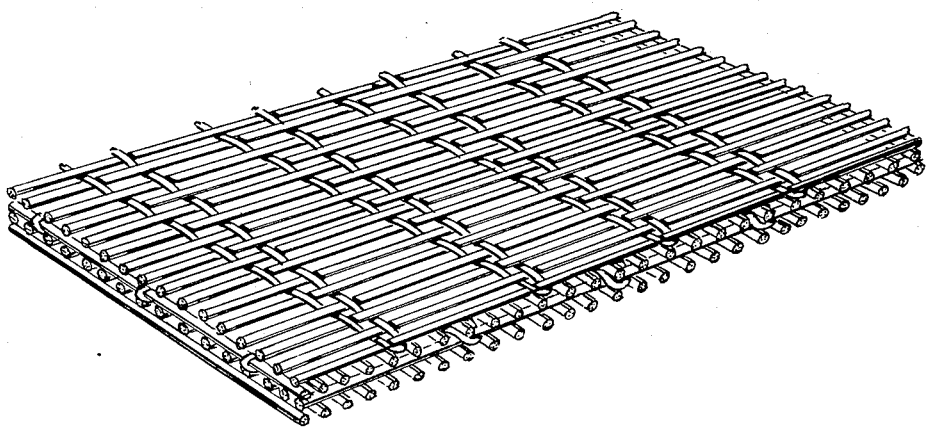
FIG. 3 is an enlarged perspective view of a section of the pervious low density carbon fiber reinforced composite article of FIG. 2.

The thermosetting resinous material may be cured in accordance with conventional curing procedures for the particular thermosetting resin system. Prior to curing a plurality of layers or plies of the carbon tape which are individually or jointly impregnated may be superimposed to form a composite article of increased thickness. For instance, two or more (e.g. up to 200, or more) layers or plies of the impregnated open weave carbon tape may be stacked in a unidirectionally aligned pattern or a multidirectionally aligned pattern (e.g. at right angles). Upon subsequent curing a unitary pervious low density composite article is formed. In FIG. 3 is illustrated an enlarged perspective view of a composite article formed in accordance with the present invention wherein four layers of the impregnated open weave carbon tape were disposed at right angles.

The resulting composite articles formed in accordance with the present invention exhibit a pore volume or open structure which amounts to approximately 10 to 75 percent by volume of the total composite article, and preferably about 50 to 70 percent by volume. Such composite articles additionally exhibit a bulk density of about 0.4 to 1.4 grams/c.c., and preferably a bulk density of about 0.5 to 1.0 grams/c.c.

The composite articles of the present invention find applicability in those areas where extremely lightweight stiff structural elements are required, e.g., in aircraft structural applications. The composite articles exhibit excellent mechanical properties, and are particularly suited for use as facing sheets of an acoustic sandwich liner which serves as a noise suppression function in a turbofan nacelle for a jet engine. The composite articles may also be formed into honeycomb core structural elements.

The following examples are provided as specific illustrations of the invention. It should be understood, however, that the invention is not limited to the specific details set forth in the examples.

In the examples highly unbalanced tapes of various plain open weave constructions were continuously passed in the direction of their length through (1) pretreatment zone, (2) a stabilization zone, and (3) a heating zone provided with a temperature gradient wherein both carbonization and graphitization were carried out. Following resin impregnation composite articles were formed incorporating the resulting graphite tape as fibrous reinforcement.

Each tape was produced by initially beaming 60 warp ends of a dry spun acrylonitrile homopolymer, and inserting a weft pick by use of a Fletcher narrow fabric loom shuttle loom. Each warp end consisted of about 385 continuous filaments having a total denier of about 775, and was provided with a twist of about 0.5 turn per inch. The 60 warp ends were aligned in an adjacent substantially parallel and laterally spaced configuration to form a flat tape having a width of 3 inches. Prior to incorporation in the tape the warp ends had been hot drawn to a single filament tenacity of about 4 grams per denier.

The pretreatment of the acrylonitrile homopolymer tape was conducted in accordance with the teachings of commonly assigned U.S. Ser. No. 17,962, filed Mar. 9, 1970 (now abandoned). The tape was continuously passed through an oven containing circulating air provided at about 220°C. while under a longitudinal tension sufficient to permit a 16 percent reduction in length brought about by shrinkage for a residence time of about 300 seconds.

The stabilization (i.e., preoxidation) was conducted in accordance with the teachings of commonly assigned U.S. Ser. No. 865,332, filed Oct. 10, 1969 (now abandoned). The tape was continuously passed through an oven containing circulating air maintained at about 270°C. while under a longitudinal tension sufficient to maintain a constant length for a residence time of about 175 minutes. The preoxidized open weave tape was black in appearance, retained its initial fibrous configuration essentially intact, was non-burning when subjected to an ordinary match flame, and contained a bound oxygen content of 10 percent by weight as determined by the Unterzaucher analysis.

The preoxidized tape was continuously passed through a heating zone of an induction furnace provided with a circulating nitrogen atmosphere and a temperature gradient in accordance with the teachings of commonly assigned U.S. Ser. No. 777,275, filed Nov. 20, 1968 (now abandoned). The hollow graphite susceptor of the induction furnace was formed in accordance with the teachings of commonly assigned U.S. Ser. No. 46,675, filed June 16, 1970 (now U.S. Pat. No. 3,656,910). The temperature gradient within the heating zone raised the tape from room temperature (i.e., about 25°C.) to a temperature of 800°C. in approximately 50 seconds after entering the susceptor, from 800°C. to 1600°C. in approximately 25 seconds to produce a carbonized tape, and from 1600°C. to 2900°C. in approximately 50 seconds where it was maintained ±50°C. for about 40 seconds to produce a graphitized tape. A longitudinal tension of 20 pounds (i.e., about 150 grams per warp end) was exerted upon the tape as it passed through the heating zone of the induction furnace. The warp ends and weft picks substantially retained their original fibrous configuration following carbonization and graphitization and exhibited a specific gravity of about 2.0. The tape exhibited a predominant x-ray diffraction pattern characteristic of graphitic carbon when subjected to x-ray analysis, contained in excess of 99 percent carbon by weight, and retained an open weave construction wherein no substantial contact was made between the laterally spaced warp ends. The Young's modulus and tensile strength of the graphite warp ends were determined.

The resulting graphite tape was next impregnated with an aromatic polyimide resin system by continuous passage for a residence time of about 10 seconds through a liquid resin bath provided at 25°C. The thermosetting resin was commercially available Pyralin 4707 polyimide (DuPont) which was diluted with acetone to form a liquid resin system having a composition of 3 parts acetone by weight, and 2 parts by weight of the commercially available resin. The commercial resin had a 45 percent by weight solids system which was convertible to an aromatic polyimide, and a solvent mixture of 2 parts by weight of N-methylpyrrolidine, and 1 part by weight of xylene.

Figure 2:
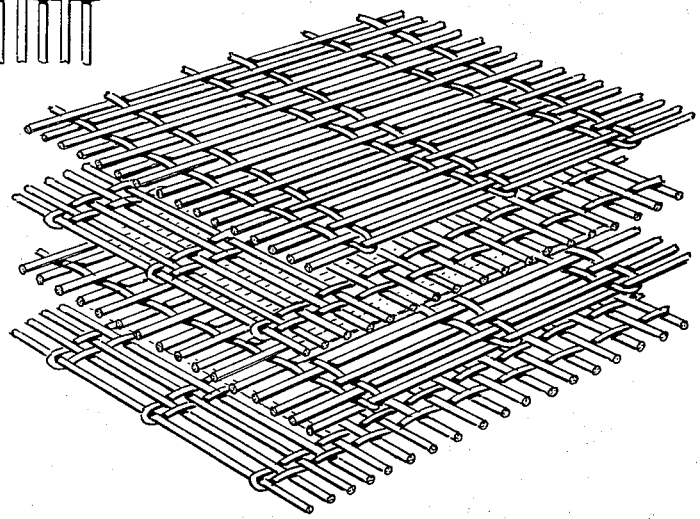
FIG. 2 is an enlarged and exploded perspective view of a section of a representative 4 ply pervious low density carbon fiber reinforced composite article formed in accordance with the present invention wherein the adjacent plies are disposed at right angles.

Composite articles of 3 × 10 inches and 0.016 inch thickness were next formed by superimposing four previously impregnated plies of the tape as illustrated in FIGS. 2 and 3. Each ply was arranged at ninety degrees to each adjoining ply. The composites were formed by a vacuum bag technique wherein the 4 resin impregnated plies were stacked in sequence, and were placed in a polyimide film bag (i.e., a Kepton polyimide film) with a bleeder cloth placed on one side of the stacked plies. The contents of the bag were subjected to a vacuum level of 24 in. Hg. while heated from room temperature (i.e., about 70°F.) to 260°F. over a 45 minute period, from 260°F. to 310°F. over a 180 minute period, and from 310°F. to 365°F. over a 20 minute period where they were maintained for a 45 minute period prior to cooling to room temperature (i.e., about 70°F.) over a 3 hour period. The cooling step was also conducted at a vacuum level of 24 in. Hg.

The bulk density, pore volume, modulus, and tensile strength for the resulting composites were determined by use of the following techniques.

The bulk density was computed as the weight of the composite article divided by the apparent volume of the same.

The percentage pore volume was computed by subtracting the weight of the pervious composite article from the weight of a corresponding solid composite article, dividing by the weight of the corresponding solid composite article, and multiplying by 100.

The modulus was computed from the initial slope of the stress strain curve obtained by standard tensile test procedures.

The tensile strength was computed from the breaking load of the composite article determined by the tensile test procedure divided by the apparent cross-sectional area of the composite article.

EXAMPLE 1

An acrylonitrile homopolymer tape having a plain weave construction as illustrated in part in FIG. 1 was employed. Representative warp ends are identified at A and representative weft picks at B. The weft pick was formed from approximately 100 continuous fils of acrylonitrile homopolymer having a total denier of about 200 and a twist of 0.5 turn per inch. The weft pick was provided at a frequency of 4 picks per inch of tape.

The width of the tape following graphitization was reduced to about 1.5 inches. The warp density of the tape following graphitization was reduced from a density of 20 ends per inch in the precursor tape to 40 ends per inch. The linear configuration of the spaced substantially parallel warp ends was retained. The warp ends exhibited a Young's modulus of about 70,000,000 psi and a tensile strength of about 300,000 psi.

The resulting 4-ply composite article of FIG. 3 contained the cured thermosetting resin in a concentration of about 30 percent by weight based upon the total weight of the composite, exhibited a bulk density of 0.82 grams/c.c., a pore volume of 50 percent, a modulus of 11,000,000 psi, and a tensile strength of 50,000 psi.

EXAMPLE II

An acrylonitrile homopolymer tape having a plain weave construction identical to that described in Example I was employed wherein the acrylonitrile homopolymer weft pick prior to formation of the tape had been previously stabilized. More specifically, the weft pick had been stabilized on a continuous basis while in yarn form by continuous passage for 60 minutes through a heating zone provided at 270°C.

The width of the tape following graphitization was reduced to about 2 inches. The warp density of the tape following graphitization was reduced from a density of 20 ends per inch in the precursor tape to 30 ends per inch. The linear configuration of the spaced substantially parallel warp ends was retained. Prior to surface treatment the warp ends exhibited a Young's modulus of about 50,000,000 psi and a tensile strength of about 300,000 psi.

The resulting 4-ply composite article contained the cured thermosetting resin in a concentration of about 25 percent by weight based upon the total weight of the composite, exhibited a bulk density of 0.6 grams/c.c., a pore volume of 69 percent, a modulus of 7,000,000 psi, and a tensile strength of 35,000 psi.

EXAMPLE III

Example I was repeated with the exception that the thermosetting resinous material was an epoxy resin rather than a polyimide and a different curing cycle was employed. More specifically, the epoxy resin system comprised approximately 200 parts by weight of a condensation product of bisphenol A and epichlorohydrin, 70.8 parts by weight diamino-diphenyl sulfone curing agent, and 300 parts by weight of acetone solvent. The curing was conducted by the vacuum bag technique previously described. The contents of the bag were subjected to a vacuum level of 24 in. Hg. while heated from room temperature (i.e. about 70°F.) to 150°F. where they were maintained for 30 minutes, from 150°F. to 350°F. over a 60 minute period where they were maintained for a 90 minute period prior to cooling to room temperature (i.e., about 70°F.) over a 2 hour period. The cooling step was also conducted at a vacuum level of 24 in. Hg.

The resulting 4-ply composite article contained the cured thermosetting resin in a concentration of about 25 percent by weight based upon the total weight of the composite, exhibited a bulk density of 0.52 grams/c.c., a pore volume of 68 percent, a modulus of 8,200,000 psi, and a tensile strength of 40,000 psi.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A pervious low density carbon fiber reinforced composite article having a pore volume of approximately 10 to 75 percent by volume of the total composite article, and a bulk density of about 0.4 to 1.4 grams/c.c. comprising:

a. at least one layer of carbon tape of an open weave construction comprising a plurality of adjacent substantially parallel and laterally spaced linear warp ends of a carbonaceous fibrous material containing at least 90 percent carbon by weight substantially coextensive with the length of said tape wherein no substantial lateral contact is made between said adjacent warp ends, and a fibrous weft pick containing at least 90 percent carbon by weight interlaced with said warp ends in a plain weave construction at a frequency of about 2 to 8 picks per inch of said tape with said weft pick being provided under a tension sufficient that said linear configuration of said warp ends is substantially unimpaired, and b. a substantially cured thermosetting resinous material in intimate association with said carbon tape in a concentration of about 20 to 50 percent by weight based upon the total weight of said composite article wherein lateral interstices are substantially maintained between said adjacent warp ends within a given layer of said tape of said composite article.

2. A pervious low density carbon fiber reinforced composite article in accordance with claim 1 wherein said warp ends and said weft pick of said carbon tape contain at least about 95 percent carbon by weight and exhibit a predominant graphitic x-ray diffraction pattern.

3. A pervious low density carbon fiber reinforced composite article in accordance with claim 1 wherein said warp ends are provided with a twist of about 0.1 to 5 turns per inch.

4. A pervious low density carbon fiber reinforced composite article in accordance with claim 3, wherein said weft pick is twisted to a lesser degree than said warp ends.

5. A pervious low density carbon fiber reinforced composite article in accordance with claim 1 wherein 50 to 200 of said warp ends are provided per layer of said tape.

6. A pervious low density carbon fiber reinforced composite article in accordance with claim 1 wherein said weft pick is provided at a frequency of about 2 to 6 picks per inch of said tape.

7. A pervious low density carbon fiber reinforced composite article in accordance with claim 1 wherein said weft pick is provided at a frequency of about 4 picks per inch of said tape.

8. A pervious low density carbon fiber reinforced composite article in accordance with claim 1 wherein said substantially cured thermosetting resin is an epoxy resin.

9. A pervious low density carbon fiber reinforced composite article in accordance with claim 1 wherein said substantially cured thermosetting resin is an aromatic polyimide resin.

10. A pervious low density carbon fiber reinforced composite article in accordance with claim 1 having a pore volume of about 50 to 70 percent by volume of the total composite article, and a bulk density of about 0.5 to 1.0 grams/c.c.

* * * * *